US012339562B2

(12) United States Patent
Endou et al.

(10) Patent No.: US 12,339,562 B2
(45) Date of Patent: Jun. 24, 2025

(54) OPTICAL MODULATOR

(71) Applicant: TDK CORPORATION, Tokyo (JP)

(72) Inventors: Kenji Endou, Tokyo (JP); Shinji Iwatsuka, Tokyo (JP); Hiroki Hara, Tokyo (JP)

(73) Assignee: TDK CORPORATION, Tokyo (JP)

( * ) Notice: Subject to any disclaimer, the term of this patent is extended or adjusted under 35 U.S.C. 154(b) by 256 days.

(21) Appl. No.: 17/789,994

(22) PCT Filed: Mar. 22, 2021

(86) PCT No.: PCT/JP2021/011695
§ 371 (c)(1),
(2) Date: Jun. 29, 2022

(87) PCT Pub. No.: WO2021/200335
PCT Pub. Date: Oct. 7, 2021

(65) Prior Publication Data
US 2023/0040729 A1 Feb. 9, 2023

(30) Foreign Application Priority Data

Mar. 31, 2020 (JP) .................. 2020-064606

(51) Int. Cl.
 *G02F 1/225* (2006.01)
 *G02F 1/21* (2006.01)
(52) U.S. Cl.
 CPC ............ *G02F 1/2255* (2013.01); *G02F 1/212* (2021.01)
(58) Field of Classification Search
 CPC .................. G02F 1/2255; G02F 1/035

USPC .......................................... 385/1–3
See application file for complete search history.

(56) References Cited

U.S. PATENT DOCUMENTS

| 11,940,708 B2* | 3/2024 | Miyazaki ................ G02F 1/035 |
| 2005/0175271 A1 | 8/2005 | Sugiyama et al. |
| 2011/0230096 A1* | 9/2011 | Atkinson ........... H01R 13/6598 |
| | | 439/607.08 |
| 2015/0138619 A1 | 5/2015 | Iwatsuka et al. |
| 2019/0339583 A1* | 11/2019 | Dell'Orto ............. G02F 1/2255 |

(Continued)

FOREIGN PATENT DOCUMENTS

| CN | 103336395 | * | 8/2016 | ........... G02F 1/1362 |
| JP | 2005-221874 A | | 8/2005 | |

(Continued)

OTHER PUBLICATIONS

"A Broadband Absorber With a Resistive Pattern Made of Ink With Graphene Nano-Platelets" by Olszewska-Placha et al, IEEE Transactions on Antennas and Propagation, vol. 63, No. 2, pp. 565-572 (Year: 2015).*

(Continued)

*Primary Examiner* — Robert Tavlykaev
(74) *Attorney, Agent, or Firm* — Oliff PLC

(57) ABSTRACT

An optical modulator includes a plurality of optical modulation units having a Mach-Zehnder type optical waveguide consisting of two optical waveguides and a high-frequency line pair arranged along the two optical waveguides and consisting of two signal electrodes for applying a pair of differential high-frequency signals, and a plurality of high-resistance conductive films are provided between adjacent high-frequency line pairs separated from the high-frequency line pair.

8 Claims, 11 Drawing Sheets

(56) References Cited

U.S. PATENT DOCUMENTS

| | | | | |
|---|---|---|---|---|
| 2021/0103198 A1* | 4/2021 | Ozaki | ................... | G02F 1/017 |
| 2022/0146901 A1* | 5/2022 | Miyazaki | ................ | G02F 1/212 |

FOREIGN PATENT DOCUMENTS

| | | | | |
|---|---|---|---|---|
| JP | 2006-195383 A | 7/2006 | | |
| JP | 2010-096989 A | 4/2010 | | |
| JP | 4485218 B2 | 6/2010 | | |
| JP | 2014-197054 A | 10/2014 | | |
| JP | 2015-118371 A | 6/2015 | | |
| JP | 2017-173365 | * | 9/2017 | ............. G02F 1/025 |
| JP | 2019-519816 A | 7/2019 | | |
| JP | 2020-134873 A | 8/2020 | | |

OTHER PUBLICATIONS

"Design and Analysis of Printed Lossy Capacitive Surface-Based Ultrawideband Low-Profile Absorber" by Kundu et al, IEEE Transactions on Antennas and Propagation, vol. 67, No. 5, pp. 3533-3538 (Year: 2019).*

"Transparent broadband metamaterial absorber based on resistive films" by Sheokand et al, Journal of Applied Physics, vol. 122, paper 105105 (Year: 2017).*

Jun. 8, 2021 International Search Report issued in International Patent Application No. PCT/JP2021/011695.

\* cited by examiner

OPTICAL MODULATOR

The present invention relates to an optical modulator.

Priority is claimed on Japanese Patent Application No. 2020-64606, filed Mar. 31, 2020, the content of which is incorporated herein by reference.

BACKGROUND ART

Communication traffic has been remarkably increased with widespread Internet use, and optical fiber communication is increasingly significant. The optical fiber communication is a technology that converts an electric signal into an optical signal and transmits the optical signal through an optical fiber and has a wide bandwidth, a low loss, and a resistance to noise.

As a system for converting an electric signal into an optical signal, there are known a direct modulation system using a semiconductor laser and an external modulation system using an optical modulator. The direct modulation system does not require the optical modulator and is thus low in cost, but has a limitation in terms of high-speed modulation and, thus, the external modulation system is used for high-speed and long-distance applications.

As the optical modulator, a Mach-Zehnder optical modulator in which an optical waveguide is formed by Ti (titanium) diffusion in the vicinity of the surface of a lithium niobate single-crystal substrate has been put to practical use (see, e.g., Patent Literature 1). The Mach-Zehnder optical modulator uses an optical waveguide (Mach-Zehnder optical waveguide) having a Mach-Zehnder interferometer structure that separates light emitted from one light source into two beams, makes the two beams pass through different paths, and then recombines the two beams to cause interference. Although high-speed optical modulators having a modulation speed of 40 Gb/s or higher are commercially available, they have a major drawback that the entire length thereof is as long as about 10 cm.

In contrast, Patent Literatures 2 and 3 disclose a Mach-Zehnder type optical modulator using a c-axis oriented lithium niobate film. The optical modulator using the lithium niobate film has realized a significant reduction in size and a lower drive voltage as compared with the optical modulator using a lithium niobate single crystal substrate.

CITATION LIST

Patent Literature

[Patent Literature 1]
Japanese Patent Publication No. 4485218
[Patent Literature 2]
Japanese Unexamined Patent Application, First Publication No. 2006-195383
[Patent Literature 3]
Japanese Unexamined Patent Application, First Publication No. 2015-118371
[Patent Literature 4]
Japanese Unexamined Patent Application, First Publication No. 2019-31794

SUMMARY OF INVENTION

Technical Problem

In an optical modulator that has been downsized, in order to reduce ripple/crosstalk and realize good characteristics, a configuration that has a differential line and does not have a ground electrode, or a configuration that does not have a ground electrode except for the end part of the differential line, has been proposed (see, Patent Literature 4).

However, in order to further reduce the size, it is necessary to narrow the distance between the differential lines, but in this case, there is a problem that the crosstalk characteristics are deteriorated. A configuration that maintains good crosstalk characteristics even when the distance between the differential lines is narrowed is desired.

As a result of diligent studies, the present inventor has found that the crosstalk characteristics are improved by repeatedly arranging isolated high-resistance conductive films between two sets of adjacent differential lines, and came up with the present invention.

An object of the present invention is to provide an optical modulator having good crosstalk characteristics.

Solution to Problem

The present invention provides the following means for solving the above problems.

The optical modulator according to one aspect of the present invention includes a plurality of optical modulation units having a Mach-Zehnder type optical waveguide consisting of two optical waveguides, and a high-frequency line pair arranged along the two optical waveguides and consisting of two signal electrodes for applying a pair of differential high-frequency signals, and a plurality of high-resistance conductive films are provided between adjacent high-frequency line pairs separated from the high-frequency line pair.

In the optical modulator according to the above aspect, the plurality of high resistance conductive films may be arranged side by side along the direction in which the high frequency line pair extends.

In the optical modulator according to the above aspect, at least two or more of the plurality of high resistance conductive films may have the same shape.

In the optical modulator according to the above aspect, the conductivity of the high resistance conductive films may be 10 to $1 \times 10^8$ [s/m].

Advantageous Effects of Invention

According to the present invention, it is possible to provide an optical modulator having good crosstalk characteristics.

DESCRIPTION OF EMBODIMENTS

Figure 1A:
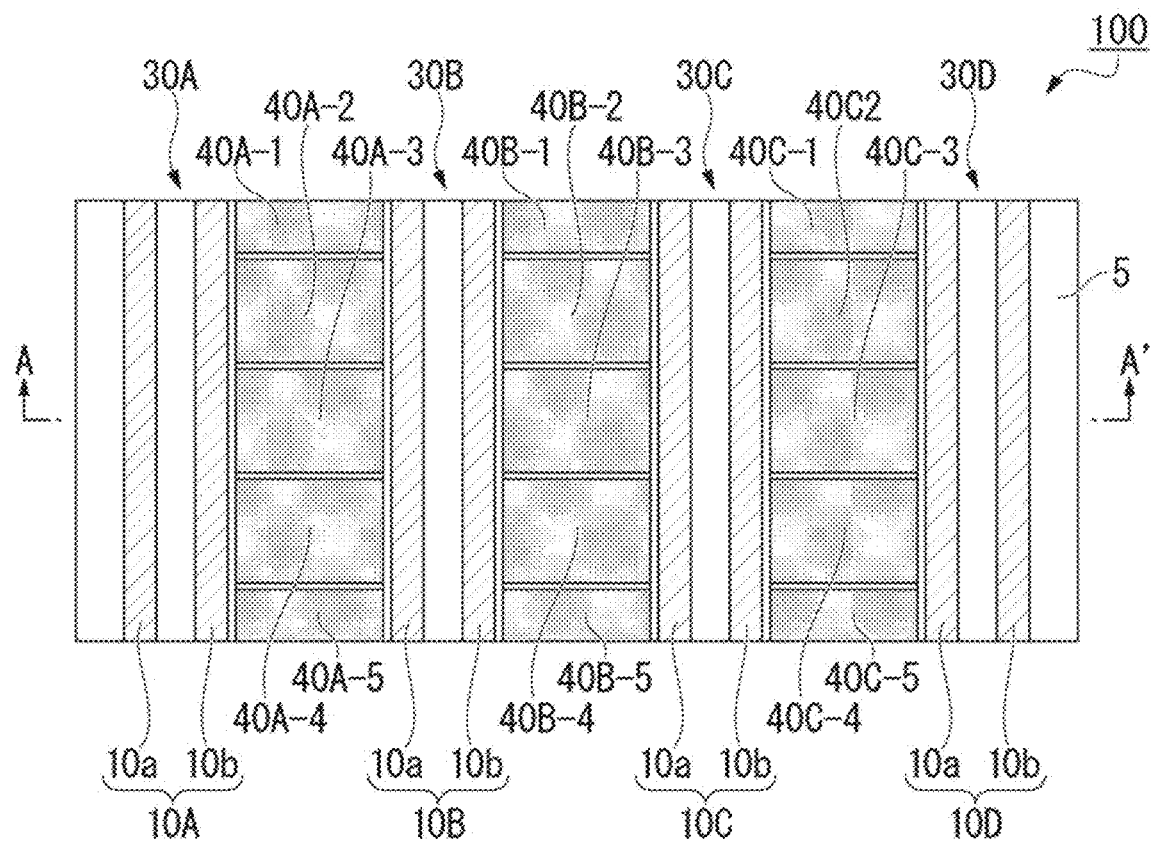
FIG. 1A is a schematic plan view of a part of the optical modulator according to the first embodiment of the present invention.

Hereinafter, embodiments of the present invention will be described with reference to the drawings as appropriate. In each of the following embodiments, the same or equal parts may be designated by the same reference numerals in the drawings. The drawings used in the following description may be enlarged for convenience in order to make the features of the present invention easy to understand, and the dimensional ratios of each component may differ from the actual ones. The materials, dimensions, and the like exemplified in the following description are examples, and the present invention is not limited thereto, and can be appropriately modified and carried out within the range in which the effects of the present invention. The configuration shown in one embodiment can also be applied to other embodiments.

Figure 1B:
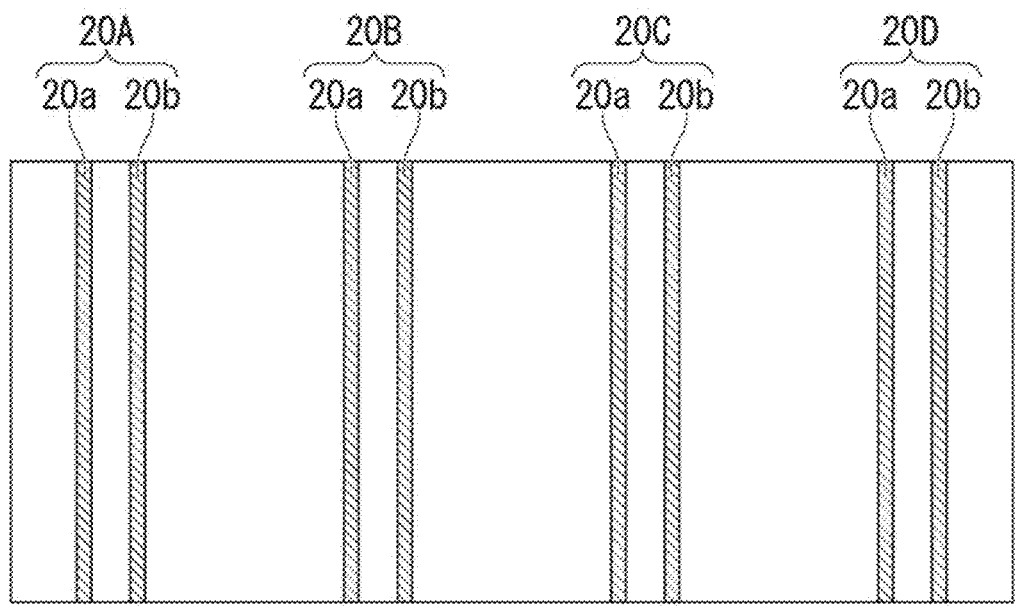
FIG. 1B shows only the optical waveguide in a part of the optical modulator shown in FIG. 1A.

FIG. 1A is a schematic plan view of a part of the optical modulator according to the first embodiment of the present invention, and FIG. 1B shows only optical waveguides.

The optical modulator 100 shown in FIG. 1A has optical modulation units 30A, 30B, 30C, 30D with Mach-Zender optical waveguides 20A, 20B, 20C, 20D composed of two optical waveguides 20a, 20b and high frequency line pairs 10A, 10B, 10C, 10D composed of two signal electrodes 10a and 10b arranged along the two optical waveguides 20a and 20b for applying a pair of differential high-frequency signals. Further, in the optical modulator 100, a plurality of high resistance conductive films 40A-1 to 40A-5, 40B-1 to 40B-5, 40C-1 to 40C-5 are provided, which are separated from the high frequency line pairs between the adjacent high frequency line pairs 10A and 10B, 10B and 10C, 10C and 10D, respectively.

In the following, the Mach-Zehnder optical waveguides 20A, 20B, 20C, and 20D may be collectively referred to as the Mach-Zehnder optical waveguide 20. Further, the high frequency line pairs 10A, 10B, 10C, and 10D may be collectively referred to as the high frequency line pair 10. Further, the optical modulation units 30A, 30B, 30C, and 30D may be collectively referred to as the optical modulation unit 30. Further, the high resistance conductive films 40A-1 to 40A-5, 40B-1 to 40B-5, and 40C-1 to 40C-5 may be collectively referred to as the high resistance conductive film 40.

The optical modulator 100 includes a plurality of Mach-Zehnder optical waveguides 20, a plurality of high-frequency line pairs 10, and a plurality of high-resistance conductive films 40 arranged between adjacent high-frequency line pairs 10 apart from the high-frequency line pairs.

The four optical modulation units 30A, 30B, 30C, and 30D can have substantially the same structure.

Each of the Mach-Zehnder optical waveguides 20A, 20B, 20C, and 20D is an optical waveguide having a structure of a Mach-Zehnder interferometer, and the first and second optical waveguides 20a and 20b branched from one optical waveguide by an optical branching portion (not shown), in which the first and second optical waveguides 20a and 20b are combined into one optical waveguide via an optical coupling portion (not shown). The input light is branched at the optical branching portion and travels through the first and second optical waveguides 20a and 20b, respectively, then combined at the optical coupling portion, and is output from the optical waveguide as modulated light.

The optical modulator of the present invention includes at least two Mach-Zehnder optical waveguides in the optical modulator, and each Mach-Zehnder optical waveguide also includes so-called nested optical waveguides in which another Mach-Zehnder optical waveguide is incorporated in a nested form in two branched optical waveguides (parallel optical waveguides, see optical waveguides shown by reference numerals 20a and 20b) of one Mach-Zehnder optical waveguide.

The two signal electrodes 10a and 10b constituting each of the four high-frequency line pairs are arranged side by side in the two optical waveguides 20a and 20b in order to apply a high-frequency differential signal.

In addition, only the portion of the signal electrodes 10a and 10b where the optical waveguides 20a and 20b extend in parallel and linearly, is shown in FIG. 1A.

The optical modulator of the present invention does not have a ground electrode and has a plurality of high resistance conductive films that are isolated and floated from the surroundings.

A plurality of high-resistance conductive films arranged between adjacent high-frequency line pairs are regularly arranged side by side along the direction in which the high-frequency line pairs extend.

In this embodiment, a plurality of high resistance conductive films are arranged between adjacent high frequency line pairs 10A and 10B, 10B and 10C, 10C and 10D. Instead of this configuration, a configuration may be provided in which a plurality of high resistance conductive films are arranged at least one between adjacent high frequency line pairs 10A and 10B, 10B and 10C, 10C and 10D.

A plurality of high-resistance conductive films 40A-1 to 40A-5 arranged apart from each other along the extending direction of the high-frequency line pair are arranged between the high-frequency line pair 10A and the high-frequency line pair 10B. A plurality of high-resistance conductive films 40B-1 to 40B-5 arranged apart from each other along the extending direction of the high-frequency line pair are arranged between the high-frequency line pair 10B and the high-frequency line pair 10C. A plurality of high-resistance conductive films 40C-1 to 40C-5 arranged apart from each other along the extending direction of the high-frequency line pair are arranged between the high-frequency line pair 10C and the high-frequency line pair 10D.

The high resistance conductive films 40A-1 to 40A-5, 40B-1 to 40B-5, and 40C-1 to 40C-5 all have the same substantially rectangular shape.

As the material of the high resistivity conductive film 40, a material with lower conductivity than a material with high conductivity as generally used for a signal electrode is used, in other words, a material with high resistivity as compared with a material with high conductivity as generally used for a signal electrode is used. That is, a material with lower conductivity than a metal material such as Au, Cu, Ag, Pt, or a material with high electrical resistivity is used.

The high resistance conductive film 40 has an effect of reducing crosstalk between adjacent high frequency line pairs. The magnetic field generated in the direction perpendicular to the signal electrode generates an electromotive force in each high resistance conductive film, and an eddy current flows, but because of the high resistance, it is consumed as heat and the power that reaches the adjacent high frequency line pair is reduced. It is considered that the crosstalk is reduced by this.

Therefore, the material of the high resistance conductive film 40 requires conductivity to the extent that an eddy current flows, but electrical resistance to the extent that it is consumed as heat is required.

The material of the high resistance conductive film 40 is preferably a material having a conductivity of 10 to $1\times10^8$ [s/m], and it is more preferably a material having a conductivity of $10^2$ to $1\times10^6$ [s/m], and it is further preferably a material having a conductivity of $1\times10^3$ to $1\times10^5$ [s/m]. In other words, using an electric resistivity, the material of the high resistance conductive film 40 is preferably a material having an electric resistivity of 0.1 to $1\times10^{-8}$ [Ω·m], and it is more preferably a material having an electric resistivity of $1\times10^{-2}$ to $1\times10^6$ [Ω·m], and it is further preferably a material having an electric resistivity of $1\times10^3$ to $1\times10^5$ [Ω2 m]. The film thickness of the high resistance conductive film 40 is preferably smaller than the film thickness of the signal electrode, and is preferably 1 μm or less.

As the material of the high resistance conductive film 40, for example, graphite, ITO, ZnO, CuO, NiCrTa, TaN and the like can be exemplified.

Figure 2:
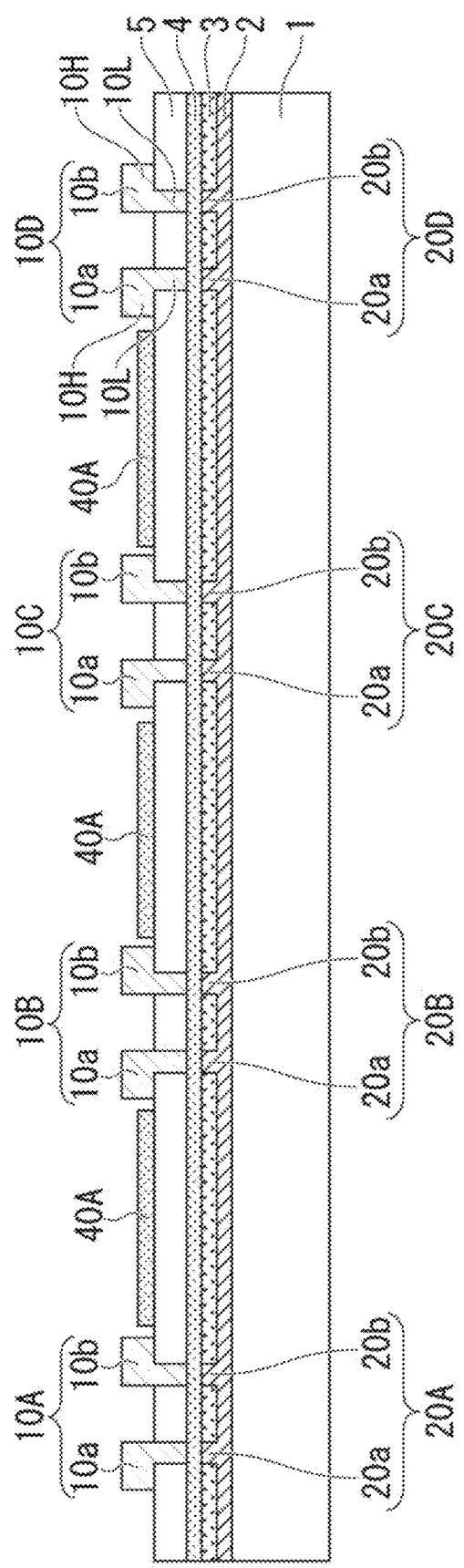
FIG. 2 is a schematic cross-sectional view of the optical modulator 100 along the A-A' line of FIG. 1A.

FIG. 2 is a schematic cross-sectional view of the optical modulator 100 along the A-A' line of FIG. 1A.

The optical modulator 100 has a multilayer structure in which a substrate 1, a waveguide layer 2, a protective layer 3, a buffer layer 4, an insulating layer 5, and a layer including signal electrodes 10a and 10b (hereinafter, may be referred to as an electrode layer 10) are laminated in this order.

The substrate 1 is, for example, a sapphire substrate, and a waveguide layer 2 made of a lithium niobate film is formed on the surface of the substrate 1. The waveguide layer 2 has first and second optical waveguides 20a and 20b composed of ridges. The widths of the first and second optical waveguides 20a and 20b can be, for example, 1 μm.

The protective layer 3 is formed in a region that does not overlap with the first and second optical waveguides 20a and 20b in a plan view. The protective layer 3 covers the entire surface of the upper surface of the waveguide layer 2 in which the ridge is not formed. Since the side surface of the ridge is also covered with the protective layer 3, it is possible to prevent the scattering loss caused by the roughness of the side surface of the ridge. The thickness of the protective layer 3 is substantially the same as the height of the ridge of the waveguide layer 2. The material of the protective layer 3 is not particularly limited, but for example, silicon oxide ($SiO_2$) can be used. It is also possible to omit the protective layer 3 and directly form the buffer layer 4 on the upper surface of the waveguide layer 2.

The buffer layer 4 is formed on the upper surface of the ridge of the waveguide layer 2 in order to prevent the light propagating in the first and second optical waveguides 20a and 20b from being absorbed by the signal electrodes 10a and 10b. As the buffer layer 4, a material having a refractive index smaller than that of the waveguide layer 2, for example, silicon oxide ($SiO_2$) or aluminum oxide ($Al_2O_3$) can be used, and the thickness thereof may be about 0.2 μm to 1 μm. In the present embodiment, the buffer layer 4 covers not only the upper surfaces of the first and second optical waveguides 20a and 20b but also the entire surface of the base surface including the upper surface of the protective layer 3. Instead of this configuration, it may be patterned so as to selectively cover only the vicinity of the upper surfaces of the first and second optical waveguides 20a and 20b.

The insulating layer 5 is provided to form a step on the lower surface of the signal electrodes 10a and 10b. An opening (slit) is formed in a region of the insulating layer 5 that overlaps with the first and second optical waveguides 20a and 20b, and the upper surface of the buffer layer 4 is exposed. By embedding a part of the electrode layer 10 in this opening, a step is formed on the lower surface of the signal electrodes 10a and 10b. The thickness T of the insulating layer 5 is preferably 1 μm or more. When the thickness of the insulating layer 5 is 1 μm or more, the effect of providing a step on the lower surfaces of the signal electrodes 10a and 10b can be obtained.

The electrode layer 10 is provided with signal electrodes 10a and 10b.

The signal electrode 10a is provided so as to be superimposed on the ridge corresponding to the first optical waveguide 20a in order to modulate the light traveling in the first optical waveguide 20a, and faces the first optical waveguide 20a via the buffer layer 4. The signal electrode 10b is provided so as to be superimposed on the ridge corresponding to the first optical waveguide 20b in order to modulate the light traveling in the first optical waveguide 20b, and faces the first optical waveguide 20b via the buffer layer 4.

The signal electrodes 10a and 10b have a two-layer structure, and each has an upper layer portion 10H formed in the electrode layer 10 and a lower layer portion 10L embedded in an opening penetrating the insulating layer 5.

The width of the lower surface of each of the lower layer portions 10L of the signal electrodes 10a and 10b is narrower than the width of the upper layer portion 10H (the total width of each of the signal electrodes 10a and 10b). The lower layer portion 10L is formed only in the vicinity of the region overlapping the first and second optical waveguides 20a and 20b in a plan view, and is not formed in the other regions. Therefore, the widths of the lower surface of the signal electrodes 10a and 10b are slightly wider than the widths of the first and second optical waveguides 20a and 20b, respectively. In order to concentrate the electric field on the signal electrodes 10a and 10b, the width of the lower surface of the signal electrodes 10a and 10b is preferably 1.1 to 15 times the width of the first and second optical waveguides 20a and 20b, respectively. It is more preferably 1.5 to 10 times.

The waveguide layer 2 is not particularly limited as long as it is an electro-optical material, but is preferably made of lithium niobate ($LiNbO_3$). This is because lithium niobate has a large electro-optic constant and is suitable as a constituent material for optical devices such as optical modulators. Hereinafter, the configuration of the present invention when the waveguide layer 2 is a lithium niobate film will be described in detail.

The substrate 1 is not particularly limited as long as it has a lower refractive index than the lithium niobate film, but a substrate capable of forming the lithium niobate film as an epitaxial film is preferable, and a sapphire single crystal substrate or a silicon single crystal substrate is preferable. The crystal orientation of the single crystal substrate is not particularly limited. The lithium niobate film has the property of being easily formed as a c-axis oriented epitaxial film on a single crystal substrate having various crystal orientations. Since the c-axis oriented lithium niobate film has a symmetry of three times symmetry, it is desirable that the underlying single crystal substrate also has the same symmetry, and in the case of a sapphire single crystal substrate, the c-plane is preferable, an in the case of a silicon single crystal substrate, a substrate having a (111) plane is preferable.

Here, the epitaxial film is a single crystal film in which the crystal orientations are aligned by growing crystals on the underlying single crystal substrate or the single crystal film. That is, the epitaxial film is a film having a single crystal orientation in the film thickness direction and the in-plane direction, and when the in-film surface is the XY plane and the film plane direction is the Z axis, the crystals are aligned in the X-axis, Y-axis, and Z-axis directions. Whether or not it is an epitaxial film can be proved, for example, by confirming the peak intensity and the extreme point at the orientation position in 2θ-θ X-ray diffraction.

The lithium niobate film has a composition of $Li_xNb_AyO_z$. A denotes an element other than Li, Nb, and O. X is 0.5 or more and 1.2 or less, preferably 0.9 or more and 1.05 or less. Y is 0 or more and 0.5 or less. Z is 1.5 or more and 4.0 or less, preferably 2.5 or more and 3.5 or less. Examples of the element A include K, Na, Rb, Cs, Be, Mg, Ca, Sr, Ba, Ti, Zr, Hf, V, Cr, Mo, W, Fe, Co, Ni, Zn, Sc, Ce, and the like, or may be a combination of two or more of them.

The film thickness of the lithium niobate film 40 is desirably 2 μm or less. This is because if the film thickness is thicker than this, it becomes difficult to form a high-quality film. On the other hand, if the film thickness of the lithium niobate film is too thin, the confinement of light in the lithium niobate film becomes weak, and light leaks to the substrate or the buffer layer and is guided. Even if an electric field is applied to the lithium niobate film, the change in the effective refractive index of the optical waveguides 20a and 20b may be small. Therefore, it is desirable that the lithium niobate film has a film thickness of about 1/10 or more of the wavelength of the light used.

The optical modulator 100 can be manufactured by a known method. It can be manufactured using semiconductor processes such as epitaxial growth, photolithography, etching, vapor phase growth and metallization.

Figure 3:
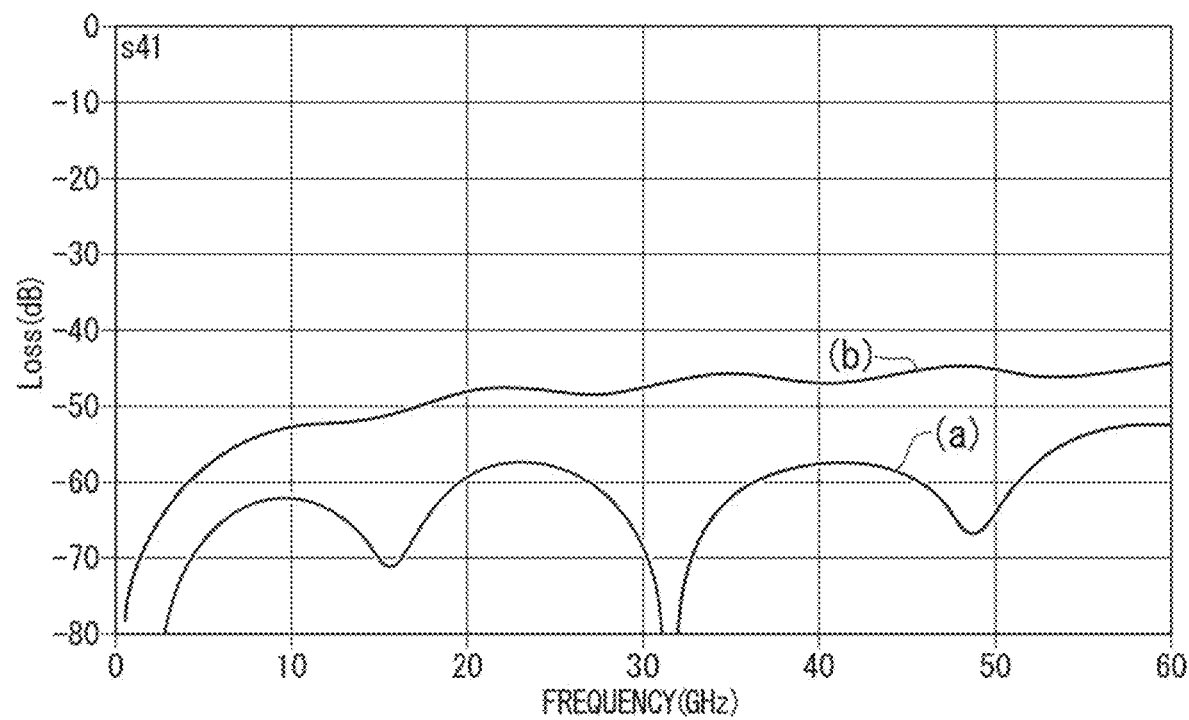
FIG. 3 shows simulation results of the difference in crosstalk characteristics between adjacent high-frequency line pairs depending on the presence or absence of a high-resistance conductive film.

FIG. 3 shows simulation results of the difference in crosstalk characteristics between adjacent high-frequency line pairs depending on the presence or absence of a high-resistance conductive film. FIG. 3 is a graph of S41 characteristics in which a signal is applied from one end side of one high frequency line pair and the signal emitted from the other end of the adjacent high frequency line pair is measured. The horizontal axis shows the signal frequency (GHz), and the vertical axis shows the crosstalk (dB) between high frequency line pairs. In FIG. 3, the graph shown by (a) is the case of the present invention having high resistance conductive films, and the graph shown by (b) is the case of not having high resistance conductive films. The simulation models of FIGS. 3(a) and 3(b) are shown in FIGS. 4A and 4B, respectively.

The simulation model has a line length of 0.5 mm, and the result of the crosstalk characteristics by the simulation is converted into the line length of the signal electrode of 10 mm.

Figure 4A:
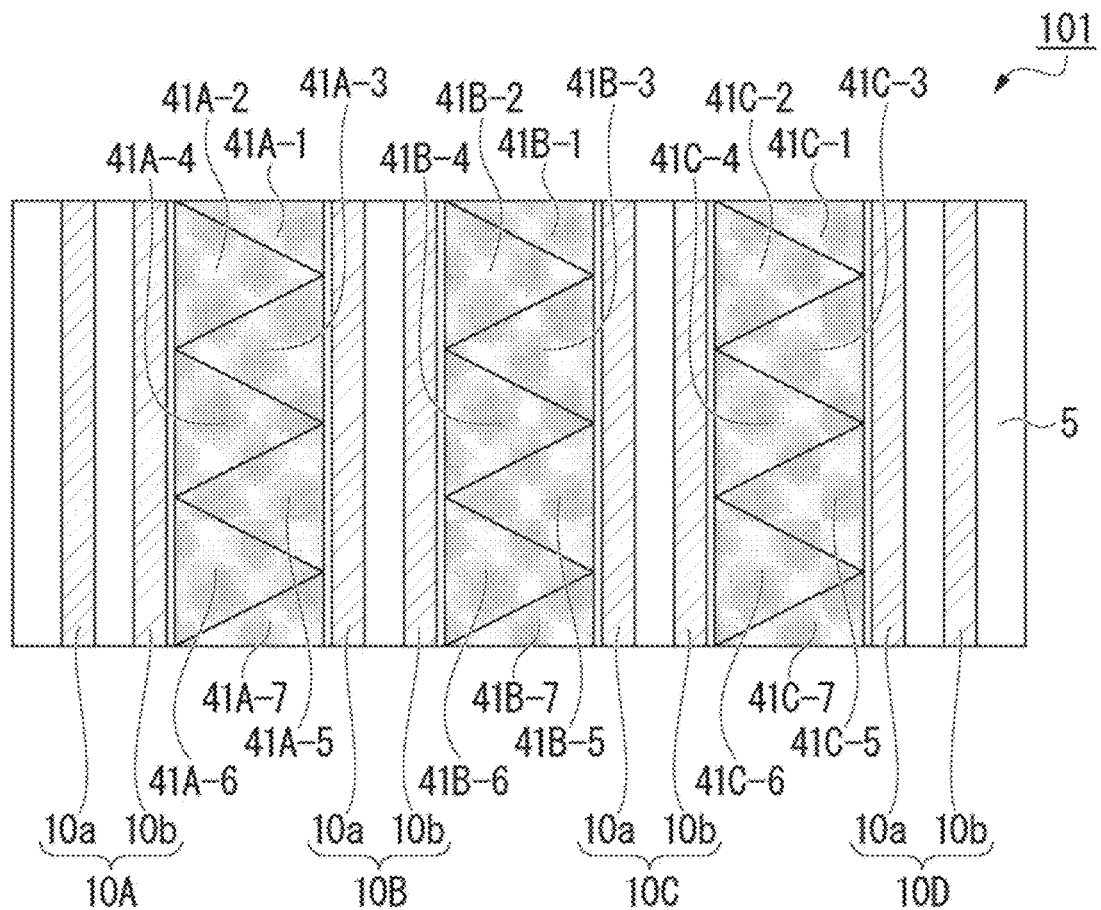
FIG. 4A is a model obtained by performing the simulation shown in FIG. 3(a).
Figure 4B:
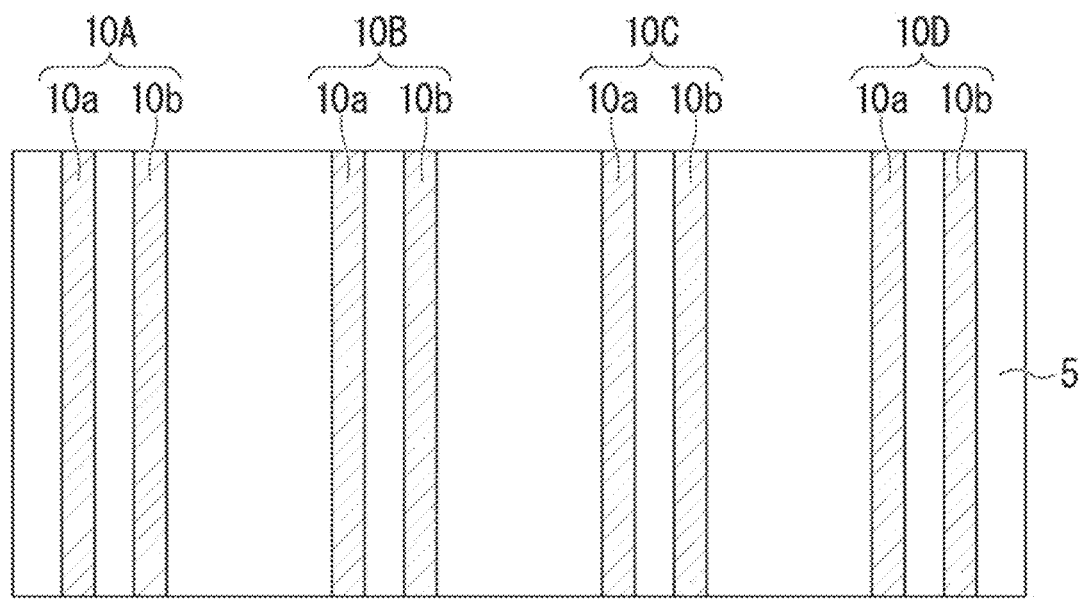
FIG. 4B is a model obtained by performing the simulation shown in FIG. 3(b).

In the optical modulator 101 shown in FIG. 4A, each high resistance conductive film has a triangular shape in a plan view, the bases of the equilateral triangles are parallel to the extending direction of the signal electrode, and the vertices of the equilateral triangles are arranged so as to be alternately opposite to each other along the extending direction of the signal electrode.

The plurality of triangular high-resistance conductive films 41A-1 to 41A-7 arranged between the high-frequency line pair 10A and the high-frequency line pair 10B are separated from each other along the direction in which the high-frequency line pair extends, and adjacent equilateral triangles are arranged alternately and repeatedly so that their vertices are oriented in opposite directions to each other. The high-resistance conductive films 41A-1, 41A-3, 41A-5, and 41A-7 are arranged so that the bases of their equilateral triangles are parallel to the extending direction of the signal electrodes 10a constituting the high-frequency line pair 10B, and so that the vertices of their equilateral triangles faces the signal electrode 10b side constituting the high frequency line pair 10A. In contrast, the high-resistance conductive films 41A-2, 41A-4, and 41A-6 are arranged so that the bases of their equilateral triangles are parallel to the extending direction of the signal electrodes 10b constituting the high-frequency line pair 10A, and so that the vertices of their equilateral triangles faces the signal electrode 10a side constituting the high frequency line pair 10B.

Similarly, the plurality of triangular high-resistance conductive films 41B-1 to 41B-7 arranged between the high-frequency line pair 10B and the high-frequency line pair 10C are separated from each other along the direction in which the high-frequency line pair extends, and adjacent equilateral triangles are arranged alternately and repeatedly so that their vertices are oriented in opposite directions to each other.

Similarly, the plurality of triangular high resistance conductive films 41C-1 to 41C-7 arranged between the high frequency line pair 10C and the high frequency line pair 10D are separated from each other along the direction in which the high frequency line pair extends, and adjacent equilateral triangles are arranged alternately and repeatedly so that their vertices are oriented in opposite directions to each other.

From FIG. 3, it can be seen that the case of having the high resistance conductive films has the effect of reducing crosstalk by about 10 dB or more in a wide high frequency region up to 60 GHz as compared with the case of not having the high resistance conductive films.

Figure 5:
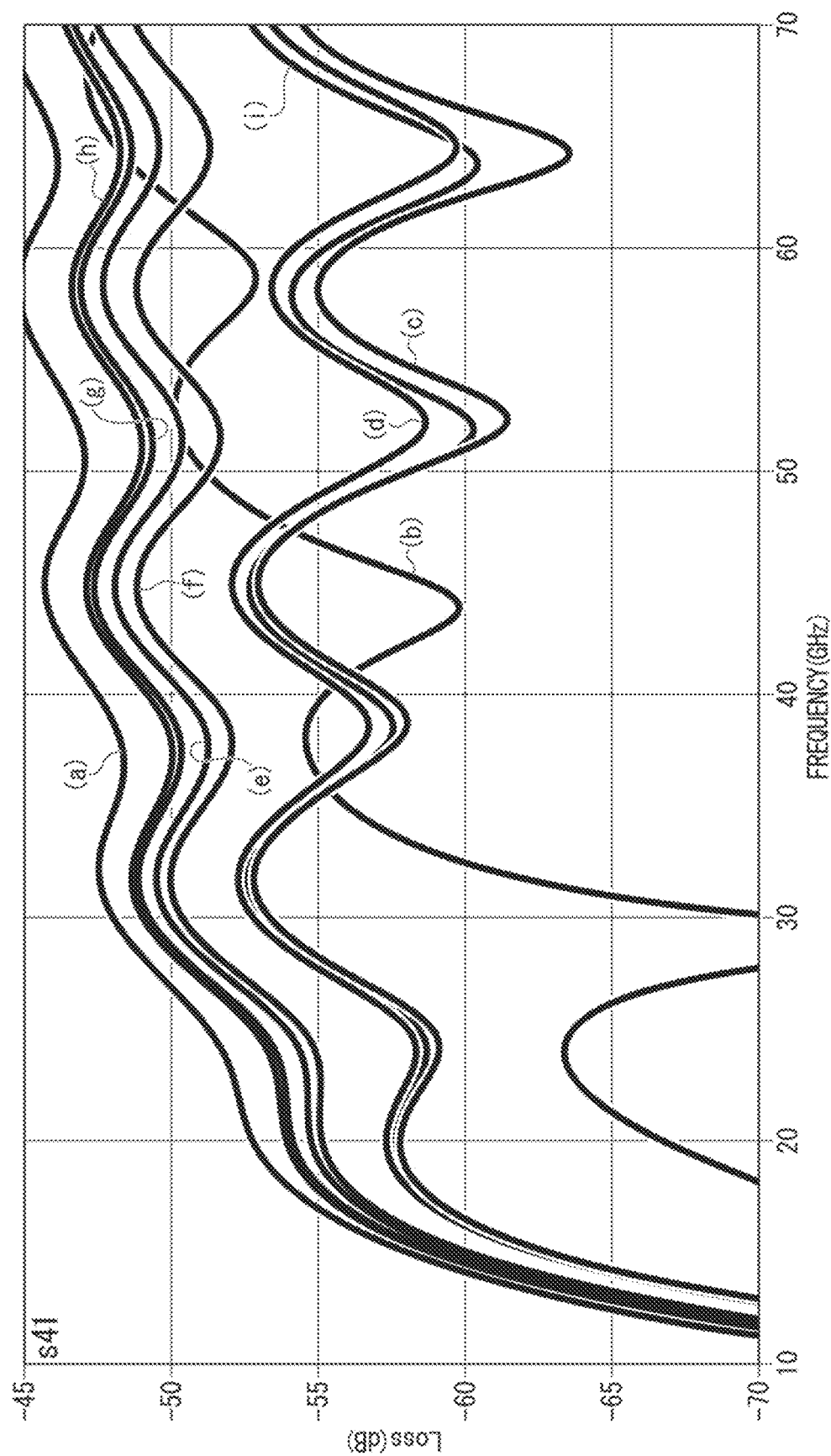
FIG. 5 shows simulation results of the difference in crosstalk characteristics between adjacent high-frequency line pairs on various arrangement patterns of high resistance conductive films.

FIG. 5 shows simulation results of the difference in crosstalk characteristics between adjacent high-frequency line pairs for the arrangement patterns of various high-resistance conductive films. FIG. 5 is a graph of S41 characteristics. The horizontal axis shows the signal frequency (GHz), and the vertical axis shows the crosstalk (dB) between high frequency line pairs. The graph shown in FIG. 5(a) is a case without a high resistance conductive film (see, FIG. 6A). The arrangement patterns of the high resistance conductive films corresponding to the simulation results of FIGS. 5(b) to 5(i) are shown in FIGS. 6(b) to 6(i), respectively.

FIG. 6(a) is a case without a high resistance conductive film, and is shown for comparison.

The arrangement pattern of the high-resistance conductive films shown in FIG. 6(b) is a pattern in which each of high-resistance conductive films is a continuous film having a rectangular shape in a plan view, and the high-resistance conductive films are arranged in a row in the extending direction of the high-frequency line pair. The arrangement pattern of the high-resistance conductive films shown in FIG. 6(c) is a pattern in which each of high-resistance conductive films is a continuous film having a rectangular shape in a plan view, and the high-resistance conductive films are arranged in two rows in the extending direction of the high-frequency line pair. The arrangement pattern of the high-resistance conductive films shown in FIG. 6(d) is a pattern in which each of high-resistance conductive films is a continuous film having a rectangular shape in a plan view, and the high-resistance conductive films are arranged in two rows parallel to each other in the extending direction of the high-frequency line pair and are half-shifted from each other. The arrangement pattern of the high-resistance conductive films shown in FIG. 6(e) is a pattern in which each of high-resistance conductive films is a continuous film having a circular shape in a plan view, and the high-resistance conductive films are arranged in two rows parallel to each other in the extending direction of the high-frequency line pair and are half-shifted from each other. The arrangement pattern of the high-resistance conductive films shown in FIG. 6(f) is a pattern in which each of high-resistance conductive films is a continuous film having a rectangular shape in a plan view, and the high-resistance conductive films are arranged in three rows in the extending direction of the high-frequency line pair. The arrangement pattern of the high-resistance conductive films shown in FIG. 6(g) is a pattern in which each of high-resistance conductive films is a continuous film having a rectangular shape in a plan view, and the high-resistance conductive films are arranged in four rows in the extending direction of the high-frequency line pair. The arrangement pattern of the high-resistance conductive films shown in FIG. 6(h) is a pattern in which each of high-resistance conductive films is a continuous film having a rectangular shape in a plan view in which each of high-resistance conductive films is shorter than that shown in FIG. 6(g), and the high-resistance conductive films are arranged in four rows in the extending direction of the high-frequency line pair. The arrangement pattern of the high-resistance conductive films shown in FIG. 6(i) is a pattern in which each of high-resistance conductive films is a continuous film having a square ring shape in a plan view, and the high-resistance conductive films are arranged in two rows in the extending direction of the high-frequency line pair.

In the case of any of the arrangement patterns of the high resistance conductive films shown in FIGS. 6(b) to 6(i), the crosstalk between adjacent high frequency line pairs is reduced in a high frequency region up to 60 GHz.

Of FIGS. 6(b), 6(c), 6(f), and 6(g), in which each high resistance conductive film has a rectangular continuous film pattern in a plan view, the pattern arranged in two rows had the best crosstalk characteristics.

Of FIGS. 6(c), 6(d), 6(e), and 6(i), in which high resistance conductive films are arranged in two rows, the pattern in which each high resistance conductive film has a rectangular continuous film pattern in a plan view had the best crosstalk characteristics.

The effect of reducing crosstalk in the arrangement pattern of the high resistance conductive films shown in FIG. 4(a) was larger than that of the arrangement patterns of the high resistance conductive films shown in FIGS. 6(b) to 6(i).

Figure 7:
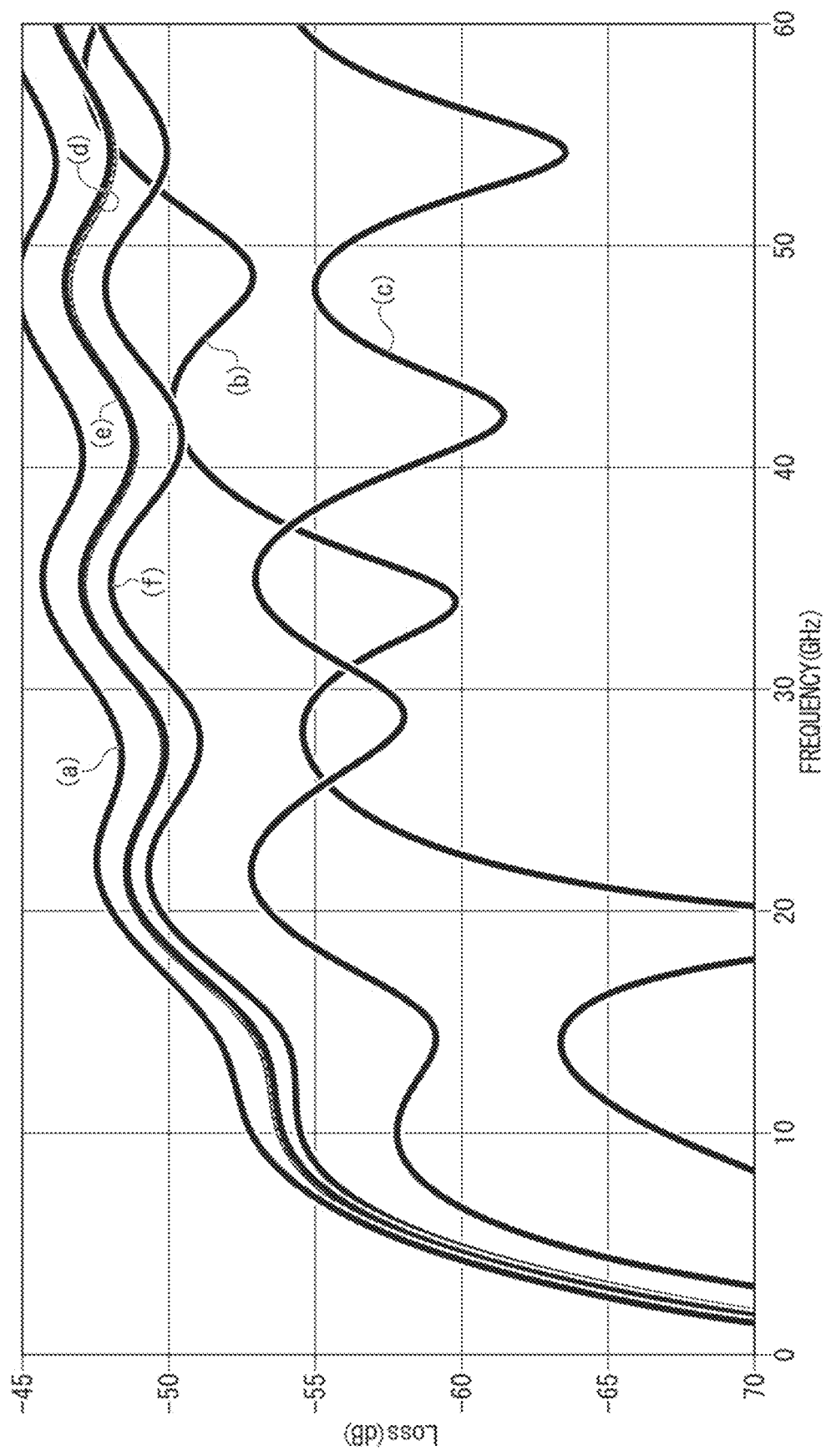
FIG. 7 shows simulation results of the difference in crosstalk characteristics between adjacent high-frequency line pairs on various arrangement patterns of high-resistance conductive films of a rectangular-shaped continuous film in a plan view.

FIG. 7 shows simulation results of the difference in crosstalk characteristics between adjacent high-frequency line pairs for various arrangement patterns of high-resistance conductive films with a rectangular continuous film in a plan view. FIG. 7 is a graph of S41 characteristics. The horizontal axis shows the signal frequency (GHz), and the vertical axis shows the crosstalk (dB) between high frequency line pairs. The graph shown in FIG. 7(a) is a case without a high resistance conductive film (see, FIG. 8(a)). The arrangement patterns of the high resistance conductive films corresponding to the simulation results of FIGS. 7(b) to 7(f) are shown in FIGS. 8(b) to 8(f), respectively.

FIG. 8(a) is a case without a high resistance conductive film, and is shown for comparison.

The arrangement pattern of the high-resistance conductive films shown in FIG. 8(b) is the same as arrangement pattern shown in FIG. 6(b), and is a pattern in which each of high-resistance conductive films is a continuous film having a rectangular shape in a plan view, and the high-resistance conductive films are arranged in a row in the extending direction of the high-frequency line pair. The arrangement pattern of the high-resistance conductive films shown in FIG. 8(c) is the same as arrangement pattern shown in FIG. 6(c), and is a pattern in which each of high-resistance conductive films is a continuous film having a rectangular shape in a plan view, and the high-resistance conductive films are arranged in two rows in the extending direction of the high-frequency line pair. The arrangement pattern of the high resistance conductive films shown in FIG. 8(d) is a pattern in which each high resistance conductive film is a continuous film having a rectangular shape in a plan view narrower than that of FIG. 8(c). Further, the high resistance conductive films are arranged in two rows in parallel in the extending direction of the high-frequency line pair, and the distance between the rows is larger than that in FIG. 8(c) due to the narrow width. The arrangement pattern of the high resistance conductive films shown in FIG. 8(e) is a pattern in which each of high-resistance conductive films is narrower than that of FIG. 8(c), to the same extent as in that of FIG. 8(d), and is a continuous film having a rectangular shape in a plan view. Further, the pattern is a pattern in which the high resistance conductive films are arranged in two rows parallel to the extending direction of the high-frequency line pair, close to one high-frequency line pair, and have a large distance from the other high-frequency line pair. The arrangement pattern of the high resistance conductive films shown in FIG. 8(f) is a pattern in which each of high-resistance conductive films is narrower than that of FIG. 8(c), to the same extent as in that of FIG. 8(d), and is a continuous film having a rectangular shape in a plan view, and the high resistance conductive films arranged in two rows parallel to the extending direction of the high-frequency line pair. One row of the high resistance conductive films is closer to one high-frequency line pair and the other row of the high resistance conductive films is closer to the other high-frequency line pair. Further, in the pattern, the distance between the two rows of high-resistance conductive films is larger than the distance between the row of high-resistance conductive films and the high-frequency line pair, and there is a large space in the central portion.

Figure 8:
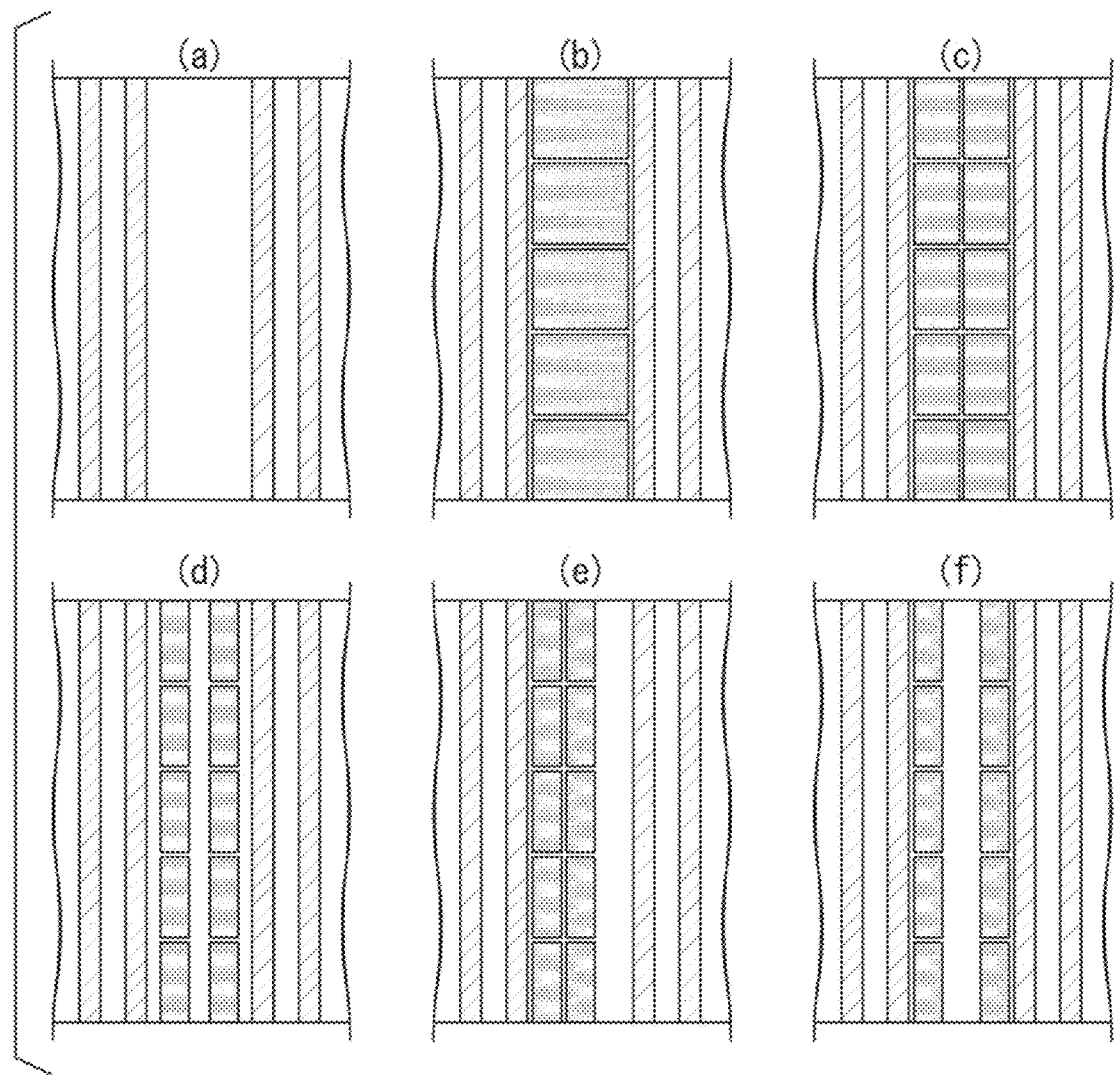
FIG. 8(a) is a simulation model of FIG. 7(a)
FIG. 8(b) is a simulation model of FIG. 7(b)
FIG. 8(c) is a simulation model of FIG. 7(c)
FIG. 8(d) is a simulation model of FIG. 7(d)
FIG. 8(e) is a simulation model of FIG. 7(e)
FIG. 8(f) is a simulation model of FIG. 7(f).

The arrangement pattern of high resistance conductive film shown in FIG. 8(c), which is a pattern in which the high-resistance conductive films are arranged most densely, among the arrangement patterns having two rows of high-resistance conductive films shown in FIGS. 8(c) to 8 (f), has the best crosstalk characteristics in the entire high frequency range up to 60 GHz.

FIG. 9(a) shows another arrangement pattern of high resistance conductive films having good crosstalk characteristics.

The arrangement pattern of the high resistance conductive films shown in FIG. 9(a) includes a plurality of high resistance conductive films having a parallelogram shape in a plan view and a triangular shape in a plan view. Further, this arrangement pattern consists of a first row consisting of a substantially parallelogram shape arranged along the extending direction of the high frequency line pair, and two rows consisting of substantially triangular shapes arranged so as to sandwich the first row.

FIG. 9(b) shows an arrangement pattern in which the crosstalk characteristics are not improved as compared with the arrangement pattern having no high resistance conductive films. The reason why the crosstalk characteristics are not improved in the arrangement pattern of the high resistance conductive films is that it has a continuous film.

Figure 10:
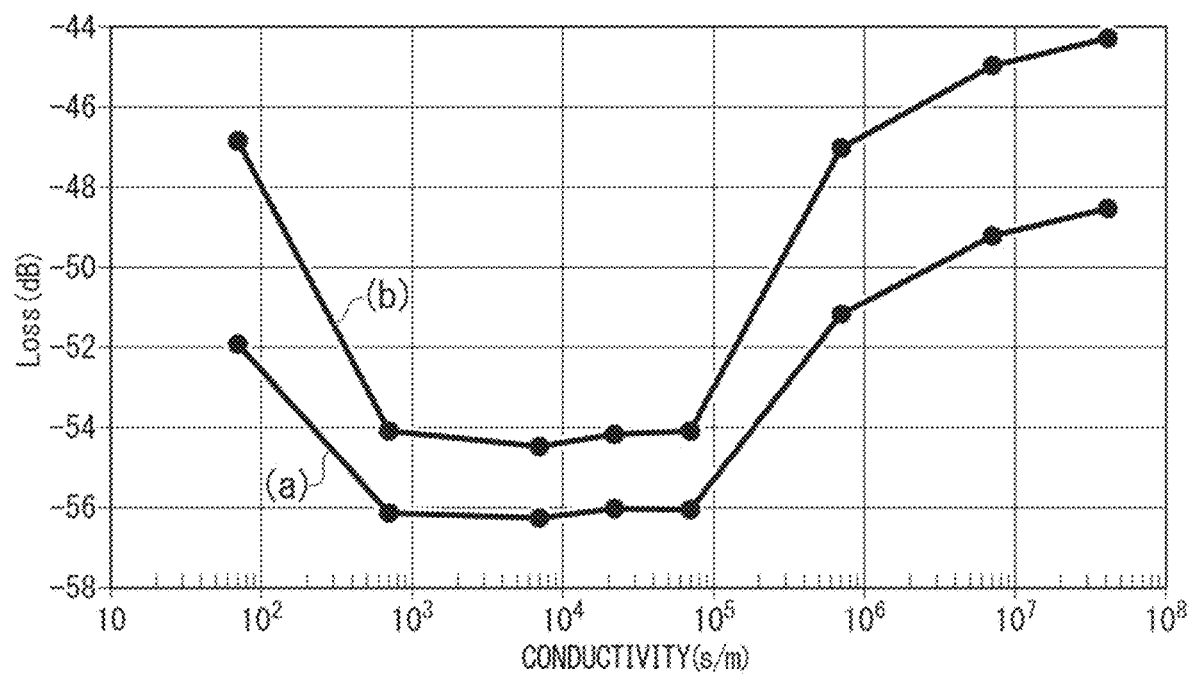
FIG. 10 shows the results of investigating the conductivity dependence of the crosstalk characteristics (S41 characteristics).

FIG. 10 shows the results of investigating the conductivity dependence of the crosstalk characteristics (S41 characteristics). The graph indicated by reference numeral (a) in FIG. 10 is an average taken at all frequency points, and the graph indicated by reference numeral (b) is an average taken at 30 GHz to 60 GHz.

From FIG. 10, it can be seen that there is a region where the crosstalk characteristics are improved when the conductivity is $4 \times 10^7$ [s/m] or less.

When the frequency range is narrowed down to 30 GHz to 60 GHz, the effect of improving the crosstalk characteristics is more remarkable, and the improvement effect is about 10 dB.

Figure 11:
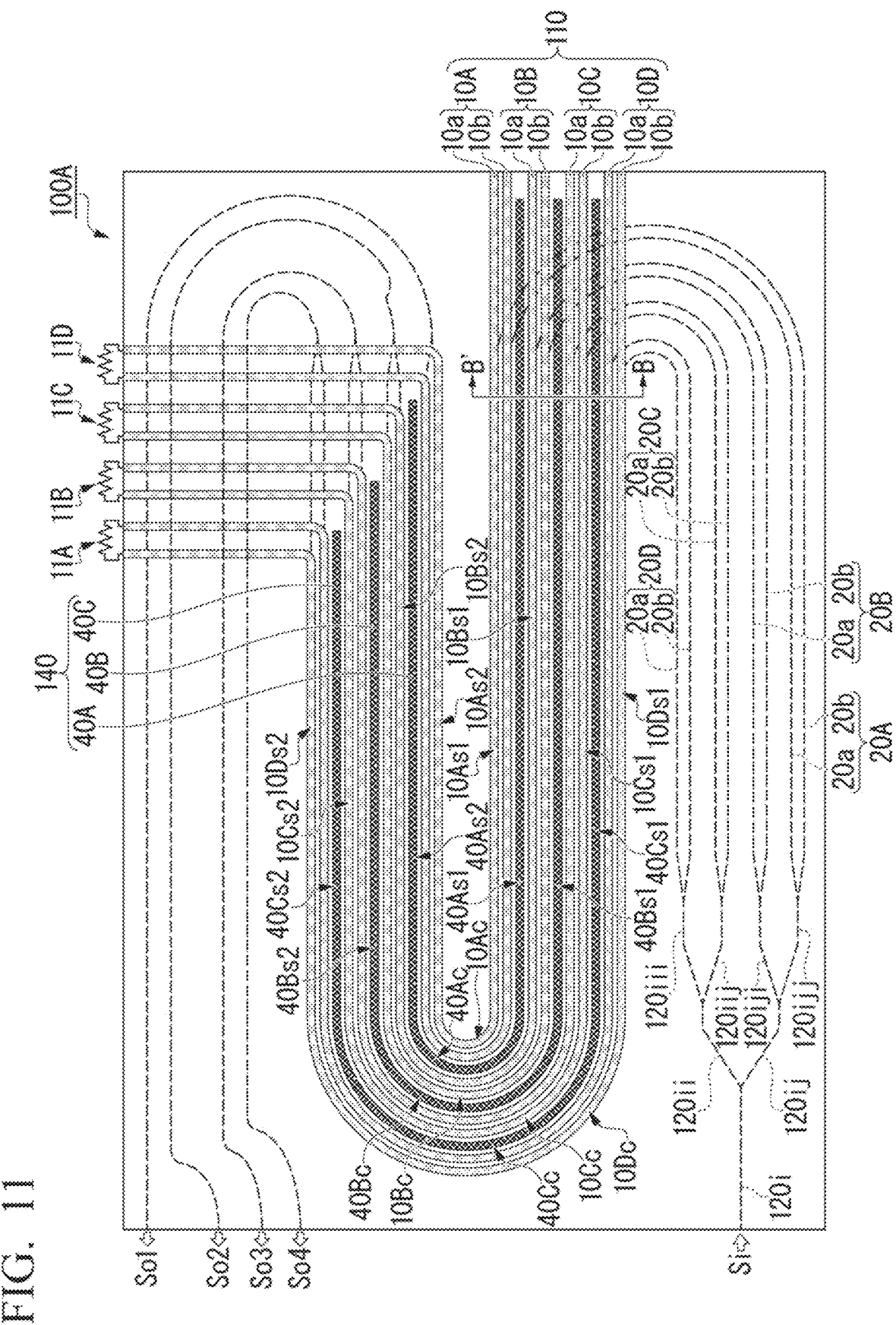
FIG. 11 shows a schematic plan view of an example of the whole including a part of the optical modulator shown in FIGS. 1 and 2.

FIG. 11 shows a schematic plan view of an example of the whole including a part of the optical modulator according to the first embodiment shown in FIGS. 1 and 2 (optical modulators having four optical modulators 30A to 30D and a plurality of high resistance conductive films 40 between them).

Figure 12:
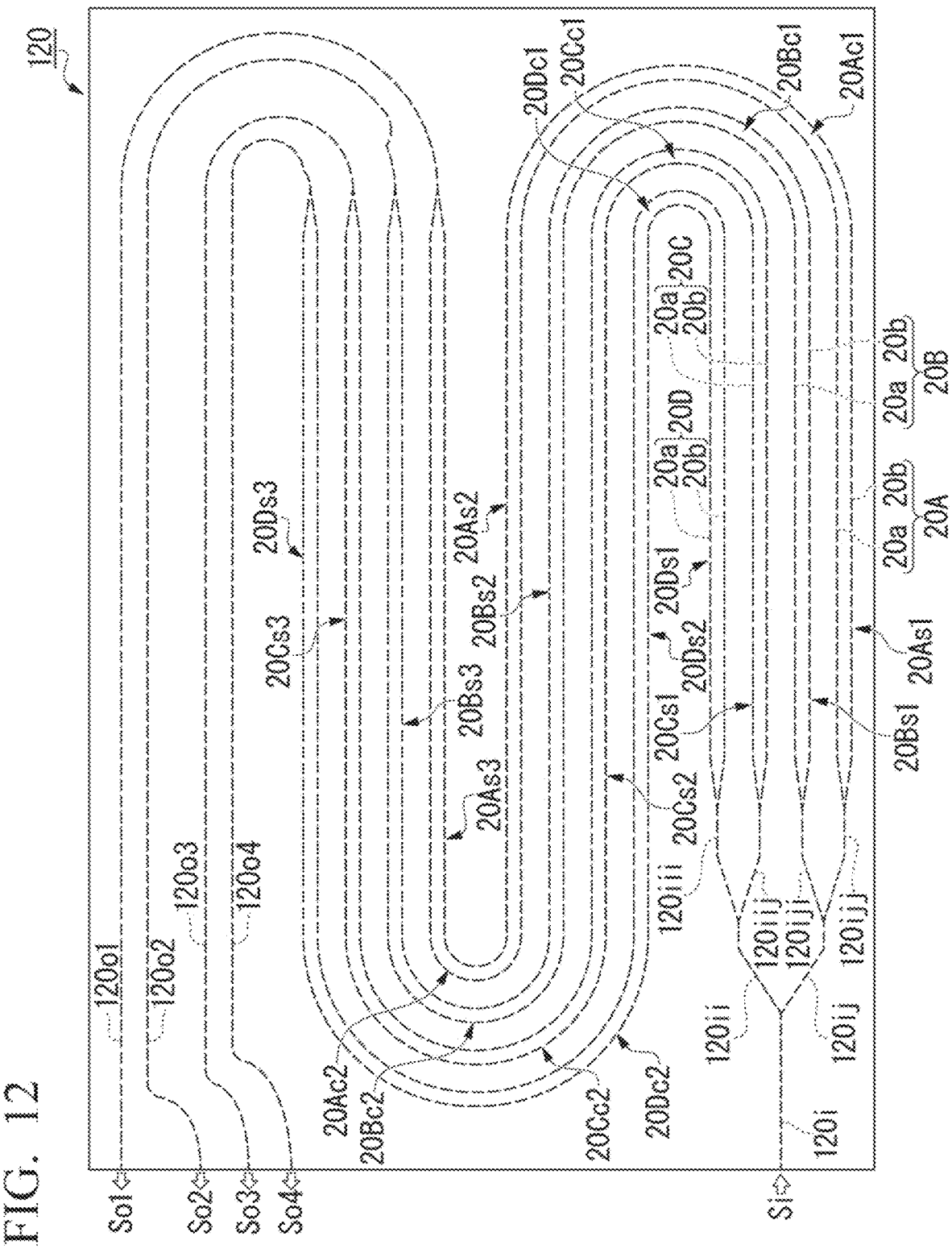
FIG. 12 shows a schematic plan view of only the optical waveguides of the optical modulator of the present invention shown in FIG. 11.

In FIG. 11, in order to show the arrangement relationship between the Mach-Zehnder optical waveguide and the high-frequency line pair, the Mach-Zehnder optical waveguide located in the layer below the high-frequency line pair is shown by a dotted line. Further, FIG. 12 shows a schematic plan view of only the optical waveguides of the optical modulator of the present invention shown in FIG. 11.

The optical modulator 100A shown in FIG. 11 includes an optical waveguide unit 120 including four Mach Zender optical waveguides 20 having a straight portion and a curved portion, and a high-frequency line 110 including high-frequency line pairs 10 consisting two signal electrodes 10a and 10b for applying a pair of differential high frequency signals, and a plurality of high-resistance conductive films 140 arranged apart from the high-frequency line pair between adjacent high-frequency line pairs.

Figure 6:
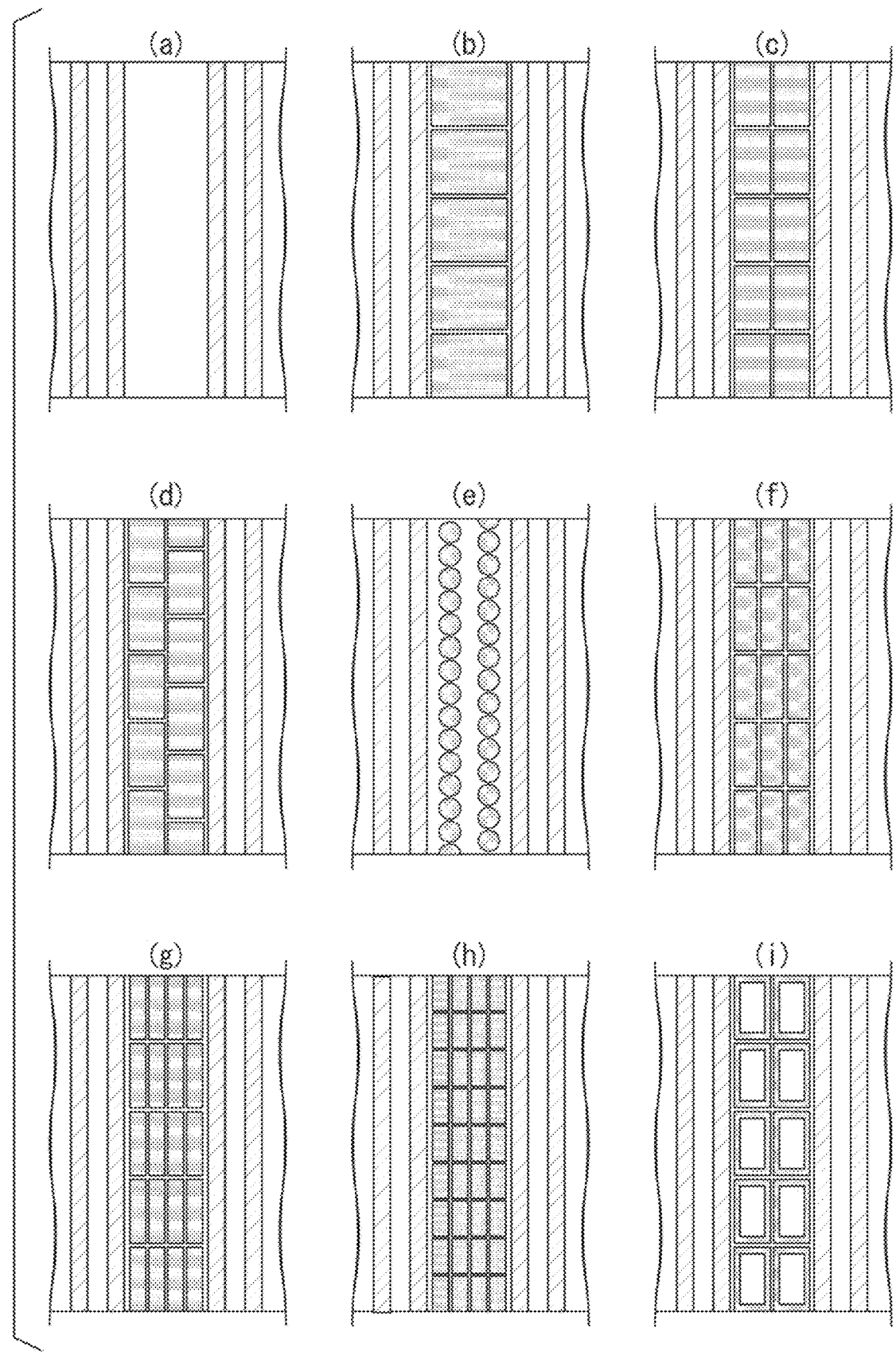
FIG. 6(a) is a simulation model of FIG. 5(a)
FIG. 6(b) is a simulation model of FIG. 5(b)
FIG. 6(c) is a simulation model of FIG. 5(c)
FIG. 6(d) is a simulation model of FIG. 5(d)
FIG. 6(e) is a simulation model of FIG. 5(e)
FIG. 6(f) is a simulation model of FIG. 5(f)
FIG. 6(g) is a simulation model of FIG. 5(g)
FIG. 6(h) is a simulation model of FIG. 5(h)
FIG. 6(i) is a simulation model of FIG. 5(i).
Figure 9:
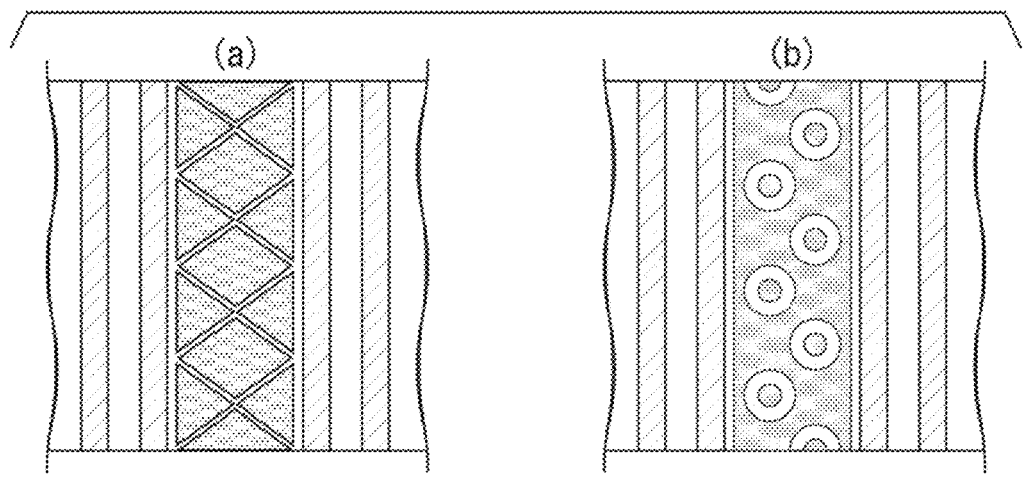
FIG. 9(a) shows another arrangement pattern of high resistance conductive films having good crosstalk characteristics.
FIG. 9(b) shows an arrangement pattern in which the crosstalk characteristics are not improved as compared with the arrangement pattern having no high resistance conductive films.

In FIG. 11, the plurality of high resistance conductive films 140 are drawn as continuous films for convenience of illustration, but as illustrated in FIGS. 6, 8 and 9, each of them are composed of a plurality of isolated high resistance conductive films.

The optical modulator 100A shown in FIG. 11 is configured such that the cross-sectional structure of the straight line portion (for example, the cross-sectional structure along the B-B' line of FIG. 11) corresponds to the cross-sectional structure shown in FIG. 2.

The optical waveguide unit 120 includes an input optical waveguide 120i input by input light Si, branched optical waveguides 120ii and 120ij branched from the input optical waveguide 120i, branched optical waveguides 120iii and 120iij, 120iji and 120ijj branched from the branched optical waveguides 120ii and 120ij, respectively, Mach Zender optical waveguides 20A, 20B, 20C, 20D branched from the branched optical waveguides 120iii, 120iij, 120iji, and 120ijj, respectively, and Mach Zender optical waveguides 12oo1, 12oo2, 12oo3 and 12oo4 where the light traveling through the 20A, 20B, 20C and 20D is combined, and the combined and modulated light travels. The light traveling through the combined optical waveguides 12oo1, 12oo2, 12oo3 and 12oo4 is output from the combined wave optical waveguides 12oo1, 12oo2, 12oo3 and 12oo4 as modulated light So1, So2, So3 and So4, respectively.

Each of the Mach-Zehnder optical waveguides 20A, 20B, 20C, and 20D constituting the Mach-Zehnder optical waveguide 20 has a straight portion and a curved portion, and is a substantially S-shaped optical waveguide as a whole.

The Mach-Zehnder optical waveguide 20A includes straight portions 20As1, 20As2, 20As3 and curved portions 20Ac1, 20Ac2, and is connected in the order of straight portions 20As1, curved portions 20Ac1, straight portions 20As2, curved portions 20Ac2, and straight portions 20As3.

The Mach-Zehnder optical waveguide 20B includes straight portions 20Bs1, 20Bs2, 20Bs3 and curved portions 20Bc1, 20Bc2, and is connected in the order of straight portions 20Bs1, curved portions 20Bc1, straight portions 20Bs2, curved portions 20Bc2, and straight portions 20Bs3.

The Mach-Zehnder optical waveguide 20C includes straight portions 20Cs1, 20Cs2, 20Cs3 and curved portions 20Cc1, 20Cc2, and is connected in the order of straight portions 20Cs1, curved portions 20Cc1, straight portions 20Cs2, curved portions 20Cc2, and straight portions 20Cs3.

The Mach-Zehnder optical waveguide 20D includes straight portions 20Ds1, 20Ds2, 20Ds3 and curved portions 20Dc1, 20Dc2, and is connected in the order of straight portions 20Ds1, curved portions 20Dc1, straight portions 20Ds2, curved portions 20Dc2, and straight portions 20Ds3.

In optical modulators, the long element length is often a problem for miniaturization. By folding the optical waveguide like the optical modulator 100A, its element length can be significantly shortened and its size can be reduced. In particular, the optical waveguides formed of the lithium niobate film are suitable for the present embodiment because it has a feature that the loss is small even if the radius of curvature is reduced to, for example, about 50 μm.

Each of the four high-frequency line pairs 10A, 10B, 10C, and 10D constituting the two signal electrodes 10a and 10b has straight portions and curved portions corresponding to the plan-view shape of the Mach Zender optical waveguide.

The high frequency line pair 10A has straight portions 10As1, 10As2 and a curved portion 10Ac, and includes a portion formed by connecting the straight portion 10As1, the curved portion 10Ac, and the straight portion 10As2 in this order. The straight portions 10As1, 10As2 and the curved portion 10Ac of the high-frequency line pair 10A are arranged above the straight portions 20As2 and 20As3 and the curved portion 20Ac2 of the Mach-Zehnder optical waveguide 20A.

The high frequency line pair 10B has straight portions 10Bs1, 10Bs2 and a curved portion 10Bc, and includes a portion formed by connecting the straight portion 10Bs1, the curved portion 10Bc, and the straight portion 10Bs2 in this order. The straight portions 10Bs1, 10Bs2 and the curved portion 10Bc of the high-frequency line pair 10B are arranged above the straight portions 20Bs2 and 20Bs3 and the curved portion 20Bc2 of the Mach-Zehnder optical waveguide 20B.

The high frequency line pair 10C has straight portions 10Cs1, 10Cs2 and a curved portion 10Cc, and includes a portion formed by connecting the straight portion 10Cs1, the curved portion 10Cc, and the straight portion 10Cs2 in this order. The straight portions 10Cs1, 10Cs2 and the curved portion 10Cc of the high-frequency line pair 10C are arranged above the straight portions 20Cs2 and 20Cs3 and the curved portion 20Cc2 of the Mach-Zehnder optical waveguide 20C.

The high frequency line pair 10D has straight portions 10Ds1, 10Ds2 and a curved portion 10Dc, and includes a portion formed by connecting the straight portion 10Ds1, the curved portion 10Dc, and the straight portion 10Ds2 in this order. The straight portions 10Ds1, 10Ds2 and the curved portion 10Dc of the high-frequency line pair 10D are arranged above the straight portions 20Ds2 and 20Ds3 and the curved portion 20Dc2 of the Mach-Zehnder optical waveguide 20D.

The high frequency line pairs 10A, 10B, 10C and 10D are connected to the terminating resistors 11A, 11B, 11C and 11D, respectively.

The plurality of high-resistance conductive films 40A, 40B, and 40C arranged between adjacent high-frequency line pairs all have a straight portion and a curved portion corresponding to the plan-view shape of the high-frequency line pair.

The plurality of high resistance conductive films 40A have straight portions 40As1, 40As2 and a curved portion 40Ac, and are connected in the order of the straight portion 40As1, the curved portion 40Ac, and the straight portion 40As2. The straight portions 40As1, 40As2 and the curved portion 40Ac of the plurality of high-resistance conductive films 40A are arranged between the straight portion 10As1, the curved portion 10Ac, and the linear portion 10As2 of the high frequency line pair 10A, and the straight portion 10Bs1, the curved portion 10Bc, and the straight portion 10Bs2 of the high frequency line pair 10B.

The plurality of high resistance conductive films 40B have straight portions 40Bs1, 40Bs2 and a curved portion 40Bc, and are connected in the order of the straight portion 40Bs1, the curved portion 40Bc, and the straight portion 40Bs2. The straight portions 40Bs1, 40Bs2 and the curved portion 40Bc of the plurality of high-resistance conductive films 40B are arranged between the straight portion 10Bs1, the curved portion 10Bc, and the linear portion 10Bs2 of the high frequency line pair 10B, and the straight portion 10Cs1, the curved portion 10Cc, and the straight portion 10Cs2 of the high frequency line pair 10C.

The plurality of high resistance conductive films 40C have straight portions 40Cs1, 40Cs2 and a curved portion 40Cc, and are connected in the order of the straight portion 40Cs1, the curved portion 40Cc, and the straight portion 40Cs2. The straight portions 40Cs1, 40Cs2 and the curved portion 40Cc of the plurality of high-resistance conductive films 40C are arranged between the straight portion 10Cs1, the curved portion 10Cc, and the linear portion 10Cs2 of the high frequency line pair 10C, and the straight portion 10Ds1, the curved portion 10Dc, and the straight portion 10Ds2 of the high frequency line pair 10D.

In the present embodiment, the plurality of high resistance conductive films 40A, 40B, and 40C all have a straight portion and a curved portion corresponding to the plan view shape of the high frequency line pair, but the present invention is not limited to this.

For example, the plurality of high resistance conductive films may have a configuration having only a straight portion. A plurality of high resistance conductive films are arranged apart from each other. When a plurality of high resistance conductive films are arranged linearly, unlike the case where the plurality of high resistance conductive films are arranged in a curve, the design is easily designed to suppress the crosstalk characteristics.

Further, when the high frequency line pair has a plurality of straight portions or a plurality of curved portions, the configuration may have a plurality of high resistance conductive films only between any of the plurality of straight portions of the high frequency line pair, or may have a plurality of high resistance conductive films only between any of the plurality of curved portions of the high frequency line pair.

REFERENCE SIGNS LIST 1 substrate
2 waveguide layer
3 protective layer
4 buffer layer
5 insulating layer
10 layer including signal electrodes
10a, 10b signal electrode
20 Mach-Zehnder optical waveguide
20a first optical waveguide
20b second optical waveguide
100, 100A optical modulator
Si input light
So1, So2, So3, So4 modulated light

What is claimed is:

1. An optical modulator, comprising:
    a plurality of optical modulation units having a Mach-Zehnder type optical waveguide including two optical waveguides, and a high-frequency line pair arranged along the two optical waveguides and including two signal electrodes for applying a pair of differential high-frequency signals; and
    a plurality of high-resistance conductive films that are provided between adjacent high-frequency line pairs that are separated from each other, wherein:
    each of the plurality of high-resistance conductive films is a continuous film having a rectangular shape in a plan view, and the plurality of the high-resistance conductive films are arranged side-by-side in two rows in an extending direction of the high-frequency line pair,
    the plurality of high-resistance conductive films are not grounded and are instead isolated and floated from surroundings, and
    the optical modulator does not have a ground electrode.

2. The optical modulator according to claim 1, wherein the plurality of high resistance conductive films in each of the two rows are arranged side by side along the extending direction of the high frequency line pair.

3. The optical modulator according to claim 1, wherein at least two or more of the plurality of high resistance conductive films have the same shape.

4. The optical modulator according to claim 1, wherein conductivity of the high resistance conductive films is 10 to $1\times10^8$ [s/m].

5. An optical modulator, comprising:
- a plurality of optical modulation units having a Mach-Zehnder type optical waveguide including two optical waveguides, and a high-frequency line pair arranged along the two optical waveguides and including two signal electrodes for applying a pair of differential high-frequency signals; and
- a plurality of high-resistance conductive films that are provided between adjacent high-frequency line pairs that are separated from each other, wherein:
- the plurality of high-resistance conductive films include high resistance conductive films having a substantially parallelogram-shape in a plan view and high resistance conductive films having a substantially triangular shape in the plan view,
- the high resistance conductive films having the substantially parallelogram-shape are arranged in a first row along the extending direction of the high-frequency line pair and the high resistance conductive films having the substantially triangular shape are arranged in two separate rows along the extending direction of the high frequency line pair so as to sandwich the first row,
- the plurality of high-resistance conductive films are not grounded and are instead isolated and floated from surroundings, and
- the optical modulator does not have a ground electrode.

6. The optical modulator according to claim 5, wherein the plurality of high resistance conductive films in each of the first row and the two separate rows are arranged side by side along the extending direction of the high frequency line pair.

7. The optical modulator according to claim 5, wherein all of the plurality of high resistance conductive films in each of the first row and the two separate rows have respectively the same shape.

8. The optical modulator according to claim 5, wherein conductivity of the plurality of high resistance conductive films is 10 to $1\times10^8$ [s/m].

* * * * *